United States Patent
Urabe

[11] Patent Number: 5,902,031
[45] Date of Patent: May 11, 1999

[54] PROJECTION COLOR IMAGE DISPLAY APPARATUS

[75] Inventor: Tetsuo Urabe, Kanagawa, Japan

[73] Assignee: Sony Corporation, Japan

[21] Appl. No.: 09/018,438

[22] Filed: Feb. 4, 1998

[30] Foreign Application Priority Data

Feb. 4, 1997 [JP] Japan ................................ P09-021834

[51] Int. Cl.[6] ............................ G03B 21/00; G03B 21/14
[52] U.S. Cl. .............................. 353/31; 353/20; 353/30; 353/33
[58] Field of Search ................................. 353/20, 33, 31, 353/30, 84, 102, 34, 37; 359/634; 349/5, 8–10

[56] References Cited

U.S. PATENT DOCUMENTS 5,181,013 1/1993 Bradshaw ................................ 340/702
5,493,351 2/1996 Hamagishi ................................ 353/84

OTHER PUBLICATIONS

Seminar Lecture Notes, Bernhard S. Scheuble, LCD's with High Information Content, SID, pp. 12–11, May 19, 1998.

*Primary Examiner*—Eddie C. Lee
*Assistant Examiner*—Teresa L. Springer
*Attorney, Agent, or Firm*—Rader, Fishman & Grauer; Ronald P. Kananen

[57] ABSTRACT

An almost parallel white beam enters a color filter, and is thereby color-separated into primary colors of R, G and B. The color-separated parallel beam enters a PBS after the beam diameter thereof is converted at a magnification of $f_2/f_1$ by a relay optical system. The polarizing beam splitter (PBS) allows p-polarized components to transmit therethrough and to enter a liquid crystal display device. Images of filter elements for R, G, and B in the color filter are reduced and formed on corresponding pixel electrodes in the liquid crystal display device, and then, reflected. The p-polarized components that are incident on the liquid crystal display device are modulated according to image signal voltages applied to the pixel electrodes (the polarization direction is changed). Then, s-polarized components generated by this modulation are reflected by the PBS, and projected in an increased size onto a screen through a projection lens.

8 Claims, 4 Drawing Sheets

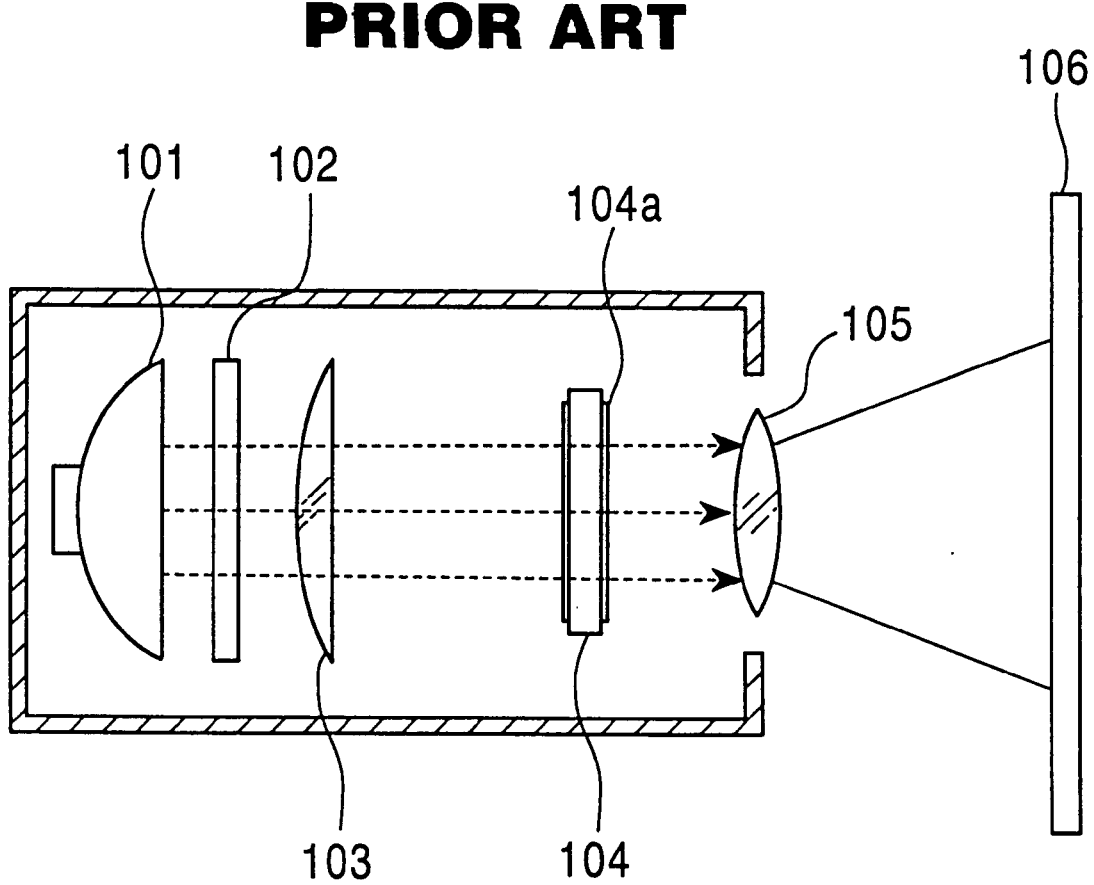

PROJECTION COLOR IMAGE DISPLAY APPARATUS

BACKGROUND OF THE INVENTION

1. Field of the Invention

The present invention relates to a projection color image display apparatus such as a liquid crystal projector, and more particularly, to a projection color image display apparatus of a single panel type that uses only one optical modulating device such as a liquid crystal display device.

2. Description of the Related Art

Liquid crystal display apparatuses include a direct-view display apparatus, and a projection display apparatus (what is called a liquid crystal projector) for projecting and displaying an image on a screen. In general, the liquid crystal projector directs lights of primary colors for color display, which are color-separated from light radiated from a single white light source, to pixels (liquid crystal cells) of a liquid crystal display device respectively corresponding to the colors, modulates the lights according to reproduction image signals, and projects the lights onto a screen, thereby displaying a color image. Such color liquid crystal projectors are roughly divided into two types: a single-panel type using a single liquid crystal display device provided with a color separation means for separating light into three colors, red (=R), green (=G), and blue (=B), and a three-panel type using three monochrome liquid crystal panels respectively provided for red, green and blue optical paths.

The single-panel color liquid crystal projector generally employs a color filter as a color separation means. Conventionally, the color filter is integrally formed with a liquid crystal display device.

FIG. 7 illustrates a conventional single-panel color liquid crystal projector using such a color-filter-combined liquid crystal display device (hereinafter referred to as a CF-combined liquid crystal display device). In the liquid crystal projector, white light emitted from a source lamp 101 enters an ultraviolet and infrared cutting filter 102, where ultraviolet and infrared rays are absorbed, and then, enters a condenser lens 103. The light condensed by the condenser lens 103 is radiated onto a CF-combined liquid crystal display device 104 located in the rear of the condenser lens 103. When passing through a liquid crystal layer (not shown) of the CF-combined liquid crystal device 104, the white light is modulated according to image signals applied to pixel electrodes on the CF-combined liquid crystal display device 104 provided for each of the primary colors (R, G and B). The white light is also color-separated into a R light, a G light, and a B light by a color filter 104a that is integrally formed with the CF-combined liquid crystal display device 104, transmitted through the CF-combined liquid crystal display device 104, and then, emitted. These modulated colored lights are condensed and synthesized by a projection lens 105 located in the rear of the CF-combined liquid crystal display device 104, and projected onto a screen 106 in an increased size.

In the projection color image display apparatus having such a structure, the aforesaid color filter 104a in the CF-combined liquid crystal display device 104 is generally made of organic pigment. Since the color filter of this pigment type absorbs light with a specific wavelength from incident light and transmits light with other wavelengths, the absorbed light is turned into heat and generates heat, or near ultraviolet rays, which are not cut by the ultraviolet-infrared cutting filter, are absorbed. Such heat generation or absorption deteriorates the color filter itself, and also affects other constituents. In particular, since the color filter using organic pigment originally has low resistance to weather, it is prone to fade with use, and color quality of a display image is thereby degenerated. Accordingly, it is an important problem to restrict this heat generation or absorption, particularly in light of future trends toward higher brightness.

Moreover, the color filter using organic pigment shows a gentle spectral transmittance curve, and has a characteristic of transmitting therethrough lights with a wide range of wavelengths other than the specific wavelength. Therefore, the use of the color filter of this type lowers color purity of a formed image.

SUMMARY OF THE INVENTION

The present invention has been made with such problems in view, and has as an object the provision of a projection color image display apparatus having a simple structure that achieves color separation with high purity and is resistant to fading.

According to the present invention, there is provided a projection color image display apparatus comprising an optical modulating device, having pixel electrodes arranged in a required pattern corresponding to basic colors necessary for color display, for modulating incident lights of the basic colors pixel by pixel according to image signals applied to the pixel electrodes, a color filter located apart from the optical modulating device and composed of filter elements for the basic colors arranged in a pattern corresponding to the required pattern, and an imaging means for forming images of the filter elements in the color filter on the optical modulating device. For example, the color filter may be a thin-film interference filter composed of layered inorganic thin films, and the optical modulating device may be a liquid crystal display device. Furthermore, the optical modulating device may be formed of, for example, an electrically controlled birefringent device that produces birefringence in incident lights through the application of voltage to pixel electrodes. The imaging means may be a beam condensing optical system including a first lens for focusing an incident parallel beam emitted from a color filter to form an image, and a second lens for converting light from the image formed by the first lens into a parallel beam having a smaller beam diameter than that of the parallel beam incident on the first lens, and emitting the converted parallel beam.

In the projection color image display apparatus of the present invention, lights from the filter elements of the color filter enter corresponding pixel electrodes of the optical modulating device each provided for basic colors, and form images thereon. The incident lights for the basic colors are modulated pixel by pixel according to image signals applied to the pixel electrodes. When the imaging means is a beam condensing optical system for reducing the diameter of a parallel beam, images of the filter elements in the color filter are projected and formed on the optical modulating device in a reduced size.

BRIEF DESCRIPTION OF THE DRAWINGS

FIG. 7 is a cross-sectional view showing the schematic structure of a liquid crystal display device in a conventional projection color image display apparatus.

DESCRIPTION OF THE PREFERRED EMBODIMENT

An embodiment of the present invention will be described below in detail with reference to the drawings.

Figure 1:
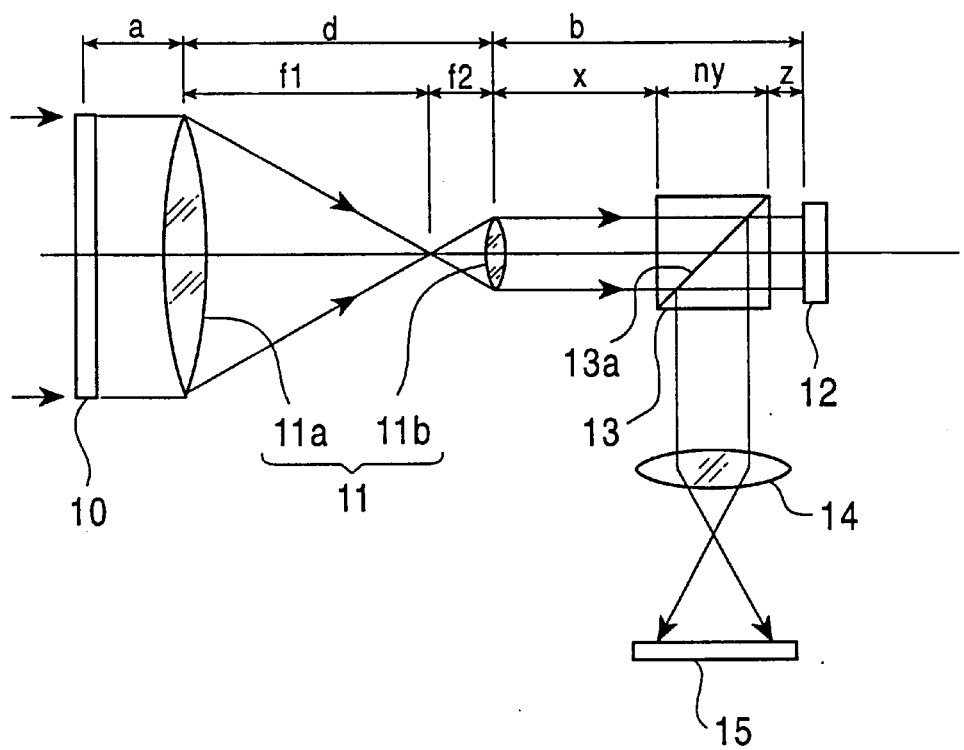
FIG. 1 is a schematic structural view of an optical system in a projection color image display apparatus according to an embodiment of the present invention.

FIG. 1 shows the structure of the principal part of a projection color image display apparatus (a liquid crystal projector) according to an embodiment of the present invention. This apparatus comprises a color filter 10, a relay optical system 11 composed of convex lenses 11a and 11b coaxially located in the rear of the color filter 10, a liquid crystal display device 12 serving as a light valve located in the rear of the convex lens 11b, a polarizing beam splitter (hereinafter abbreviated as "PBS") 13 located between the convex lens 11b and the liquid crystal display device 12, a projection lens 14 having the optical axis intersecting the optical axis of the convex lenses 11a and 11b and located on the side of the PBS 13, and a screen 15 located opposite the projection lens 14. The liquid crystal display device 12 corresponds to the optical modulating device in the present invention, the color filter 10 corresponds to the color filter in the present invention, and the relay optical system 11 consisting of the convex lenses 11a and 11b corresponds to the imaging means in the present invention.

Figure 2:
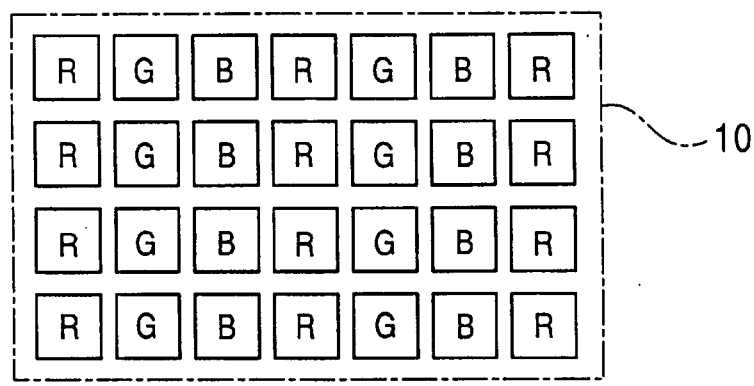
FIG. 2 is a view showing a layout pattern of filter elements for colors in a color filter shown in FIG. 1.

The color filter 10 is composed of filter elements for colors R, G, and B that are regularly arranged, as shown in 1 FIG. 2. Three primary colors R, G, and B correspond to basic colors necessary for color display in the present invention. These filter elements are each, for example, a thin-film interference filter that is formed by laminating thin films of metal, a dielectric, or the like. When white light enters, each R element reflects B and G lights and transmits only R light therethrough, each G element reflects R and B lights and transmits only G light therethrough, and each B element reflects R and G lights and transmits only B light therethrough. Such a thin-film interference filter can be formed by alternately laminating films having a high refractive index (for example, titanium dioxide ($TiO_2$) films) and films having a low refractive index (for example, silicon dioxide ($SiO_2$) films). The R, G, and B filter elements can be formed by repeating a thin film laminating process using well-known photolithography technology. In that case, the properties required of the filter elements can be easily obtained by appropriately setting, for example, the thickness and number of thin films to be laminated. The layout pattern of the R, G, and B filter elements is not limited to that shown in FIG. 2, and it may be an arbitrary layout pattern as long as it corresponds to the layout pattern of pixel electrodes in the liquid crystal display device 12.

The PBS 13 is provided with a polarizing separation plane 13a that has the property of transmitting p-polarized light and reflecting s-polarized light. The PBS 13 is located so that the polarizing separation plane 13a forms about 45° with the optical axis of the relay optical system 11. The p-polarized component means linearly polarized light in which the oscillation direction of an electric vector of light incident on the polarizing separation plane 13a is included in the incident plane (a plane including the normal to the polarizing separation plane 13a and the wave normal (the travel direction of light), and the s-polarized component means linearly polarized light in which the oscillation direction of an electric vector of light incident on the polarizing separation plane 13a is orthogonal to the incident plane.

Figure 3:
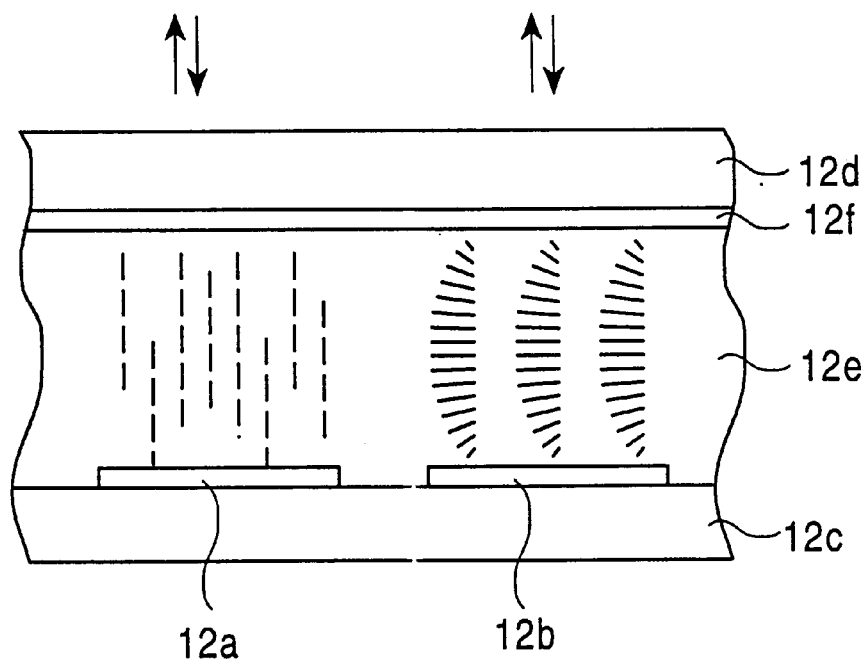
FIG. 3 is a cross-sectional view showing a structure and an operation of a liquid crystal display device shown in FIG. 1.

The liquid crystal display device 12 is, for example, an optical modulating device of an electrically controlled birefringent (ECB) type, and has, for example, the structure shown in FIG. 3. As shown in FIG. 3, the liquid crystal display device 12 comprises a pixel substrate 12c on which pixel electrodes 12a, 12b and so on are regularly formed, a counter substrate 12d located opposed to the front side (light incident side) of the pixel substrate 12c with a required spacing, a liquid crystal layer 12e sandwiched between the pixel substrate 12c and the counter electrode 12d, and a counter electrode 12f formed on the rear side (light emergent side) of the counter electrode 12d. The pixel electrodes 12a, 12b and so on are formed as reflecting electrodes each for reflecting incident light from the surface thereof. The layout pattern of the pixel electrodes 12a, 12b and so on in the liquid crystal display device 12 corresponds to the layout pattern of the filter elements (R, G, and B) in the color filter 10. That is, for example, one filter element R in the color filter 10 corresponds to one pixel electrode for R in the liquid crystal display device 12. This also applies to other filter elements.

Regions among the pixel electrodes 12a, 12b and so on are black matrix sections that are provided with TFTs or the like respectively for the pixel electrodes to switch voltage application to the pixel electrodes, and they are each shielded from light by a film (not shown) of metal, such as aluminum, so that light leakage of the TFT is not caused by light radiation.

Figure 4:
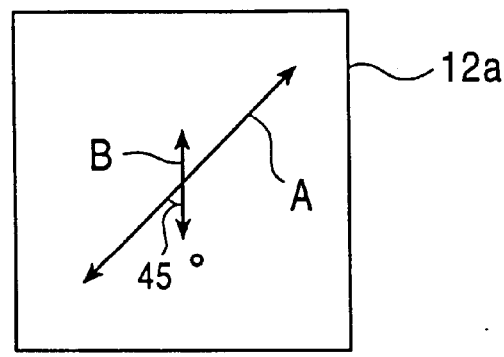
FIG. 4 is a view showing the relationship between the liquid crystal alignment direction and the polarization direction of incident light in the liquid crystal display device of FIG. 3.

The pixel electrodes 12a, 12b and so on are each assigned to colors (B, R, and G). When an image signal voltage for one of the colors is applied to each pixel electrode, the alignment of liquid crystal molecules in a region of the liquid crystal layer 12e corresponding to the pixel electrode is changed, and the polarization direction of light that passes through the region is thereby changed. That is, for example, as shown in FIG. 3, the alignment in a region of the liquid crystal layer 12e corresponding to the pixel electrode 12a, to which no voltage is applied, is parallel to the optical axis, and the alignment in a region corresponding to the pixel electrode 12b, to which voltage is applied, is orthogonal to the optical axis, provided an alignment direction A when voltage is applied is, as shown in FIG. 4, set so that it is inclined at 45° with respect to a polarization direction B of incident light that contains only a p-polarized component after passing through the PBS 13. Accordingly, lights of colors G, B, and R that are incident on the liquid crystal display device 12 are selectively modulated by each pixel electrode while traveling back and forth in the liquid crystal layer 12e so that the polarization direction thereof changes by an angle corresponding to the applied voltage. Then, only s-polarized components of the colored lights emitted from the liquid crystal display device 12 are reflected by the PBS 13, directed to the projection lens 14, condensed and synthesized, and used for imaging on the screen 15.

In this embodiment, a distance d between the convex lenses 11a and 11b is set so that the following equation (1) is satisfied:

$$d = f_1 + f_2 \tag{1}$$

where $f_1$ represents the focal distance of the convex lens 11a, and $f_2$ represents the focal distance of the convex lens 11b. That is, the convex lenses 11a and 11b constitute a relay optical system having a magnification of $f_2/f_1$.

The distance between the convex lens 11b and the liquid crystal display device 12 is set so that an image of each filter element in the color filter 10 is formed onto the liquid crystal display device 12 by the relay optical system consisting of the convex lenses 11a and 11b. That is, when it is assumed that the distance between the color filter 10 and the convex lens 11a is taken as a and the distance between the convex lens 11b and the liquid crystal display device 12 is taken as b, the distance b is set so that it satisfies the following equations (2) and (3):

$$b = [f_2(f_1+f_2) - af_1f_2/(a-f_1)]/[f_1 - af_1/(a-f_1)] \tag{2}$$

$$b = x + ny + z \tag{3}$$

where x represents the distance between the convex lens 11b and the PBS 13, y represents the length of the PBS 13 in the direction of the optical axis, z represents the distance between the PBS 13 and the liquid crystal display device 12, and n represents the refractive index of the PBS 13.

Next, the operation of the projection color image display apparatus having the above structure will be described.

White light radiated from a light source (not shown) enters the color filter 10 as parallel light. The filter elements in the color filter 10 each separate the incident white light into lights of primary colors R, G, and B by reflecting light with specific wavelengths of the white light and transmitting light with other wavelengths therethrough. The parallel beam consisting of color-separated lights enters the convex lens 11a in the relay optical system 11, is condensed and focused, and then, is converted again into a parallel beam by the convex lens 11b. At this time, the diameter of the parallel beam emitted from the convex lens 11b is $f_2/f_1$ times that of the initial light beam. The parallel beam emitted from the convex lens 11b enters the PBS 13, and only a p-polarized component thereof transmits through the polarizing plane 13a of the PBS 13 and enters the liquid crystal display device 12. Thereby, pattern images, which are reduced to $f_2/f_1$ times the size of the filter elements in the color filter 10, are formed by projection. The pattern of the images corresponds to the layout pattern of the pixel electrodes 12a, 12b and so on on the pixel substrate 12c (FIG. 3). That is, for example, a reduced image of one filter element R in the color filter 10 is formed on the pixel electrode for R in the liquid crystal display device 12. This also applies to reduced images of other filter elements in the color filter 10.

As shown in FIG. 3, although the alignment direction of the liquid crystal is vertical in the liquid crystal layer 12e of the liquid crystal display device 12 when no voltage is applied to the pixel electrode, if voltage is applied, the alignment direction of the liquid crystal changes to the horizontal direction and birefringence of incident light arises. Therefore, the light incident on the liquid crystal display device 12 (p-polarized component) is modulated depending on the voltage applied to the pixel electrode, and an s-polarized component is thereby generated. The s-polarized component is reflected by the PBS 13, and enlarged and projected onto the screen 15 by the projection lens 14.

Figure 5:
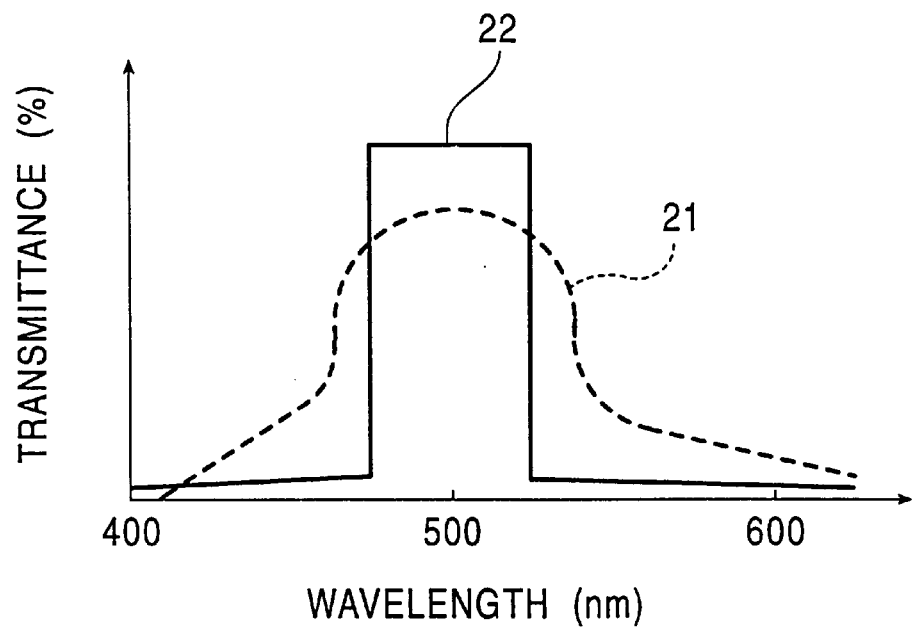
FIG. 5 is a view showing spectral transmittance characteristics of a thin-film interference color filter and a pigment color filter.

FIG. 5 shows spectral transmittance characteristics of a color filter of the thin-film interference type and a color filter of the pigment type. Here, G filter elements are given as an example. In this figure, numerals 21 and 22 respectively denote spectral transmittance characteristics of the pigment color filter and the thin-film interference color filter. The horizontal axis represents the wavelength of light, and the vertical axis represents the spectral transmittance.

As this figure reveals, a spectral transmittance curve of the pigment type 21 has a lower peak than that of the thin-film interference type 22, and is gently curved so that it extends to wavelength regions other than an objective transmission wavelength region. Moreover, the transmission band thereof is wide. Therefore, when the pigment-type color filter is used, brightness and color purity of a formed image are both low. On the other hand, since the spectral transmittance curve has a high peak and the edges of the transmission band are sharp in the thin-film interference type 22, only light with wavelengths in a specific region is allowed to be transmitted therethrough. Accordingly, when this color filter of the thin-film interference type is used, since brightness and color purity of a formed image are high, it is possible to produce a high-quality image display. In addition, since the thin-film interference type is formed of inorganic films as distinct from the pigment type formed of organic films, it does not fade and has high weather resistance and high durability.

As mentioned above, in the projection color image display apparatus according to this embodiment, the color filter is not integrated with the liquid crystal display device 12 and is separately located apart therefrom, and images of filter elements in the color filter 10 are formed in a reduced size on the liquid crystal display device 12 through the relay optical system 11. Therefore, even if the size and pitch of the layout pattern of the filter elements in the color filter 10 are relatively coarse, images of the filter elements are projected in a reduced size onto corresponding pixel electrodes of the liquid crystal display device 12, and matched with a high-definition layout pattern of the pixel electrodes. That is, it is possible to accurately modulate respective colored lights by the pixel electrodes without increasing manufacturing accuracy of the color filter 10, and to thereby achieve a high-definition image display. Furthermore, since the color filter 10 is separate from the liquid crystal display device 12, a liquid crystal display device manufactured for a monochrome apparatus may be used as the liquid crystal display device 12. In this case, the monochrome liquid crystal display device functions as if to be equipped with a color filter, which makes it possible to display a high-definition color image. Still furthermore, since the color filter 10 is of a thin-film interference type in this embodiment, it does not generate heat due to absorption as distinct from the pigment type, has high weather resistance and high durability, and is resistant to fading.

Figure 6:
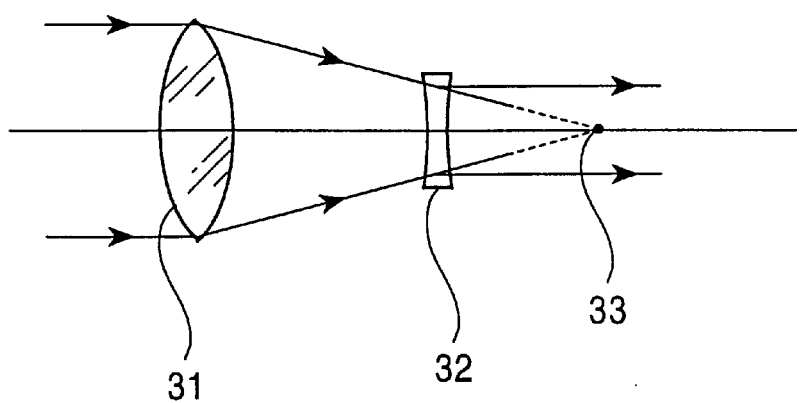
FIG. 6 is a view showing another structure of a relay optical system for use in the projection color image display apparatus of the present invention.

While the present invention has been described with reference to the embodiment thereof, it is not limited to this embodiment, and various equivalent modifications are possible. For example, although the relay optical system 11 in the aforesaid embodiment is of what is called a Keplerian type that employs the two convex lenses 11a and 11b, it may be of what is called a Galilean type that employs a convex lens 31 and a concave lens 32 as shown in FIG. 6. In this case, a virtual focus 33 of the convex lens 31 functions as a new virtual object point of the convex lens 32, and a parallel beam of a reduced diameter is emitted from the concave lens 32.

Although the liquid crystal display device 12 is of a reflection type and light reflected therefrom is separated by the PBS 13 in this embodiment, the present invention is also applicable to a transmission-type liquid crystal display device. In this case, the PBS 13 is unnecessary, and the projection lens 14 and the screen 15 are placed in this order behind the liquid crystal display device 12.

Furthermore, although the liquid crystal display device 12 in this embodiment is an optical modulated device of an electrically controlled birefringent (ECB) type, it may be a liquid crystal display device of a reflected light intensity modulation type or a light scattering type.

Still furthermore, although the liquid crystal display device in this embodiment has been described as an optical modulating device of an electrically controlled birefringent type, the present invention is not limited to this. Other devices that cause birefringence in incident light through the application of voltage, for example, PLZT (lead lanthanum zirconate titanate) that is a transparent ceramic obtained by doping lead zirconate titanate with strontium), may be used.

In addition, the color filter 10 is not limited to the thin-film interference type, and may be of another type (for example, the conventional organic pigment type).

As mentioned above, according to the projection color image display apparatus of the present invention, a color filter is placed apart from an optical modulating device, images of filter elements in the color filter are formed on corresponding pixel electrodes for basic colors in the optical modulating device by causing lights from the filter elements to enter the pixel electrodes, and the incident lights for the basic colors are modulated pixel by pixel according to image signals applied to the pixel electrodes. Therefore, it is possible to produce a color filter separately from an optical modulating device and to use the color filter for color image display. This provides the advantage of applying a monochrome optical modulating device to a color optical modulating device. In addition, the degree of freedom of layout of optical elements is increased in manufacturing the apparatus.

In particular, since the color filter is a thin-film interference filter formed by laminating inorganic thin films, it is possible to obtain a color filter having a spectral transmittance characteristic in which the peak of transmittance is high and the edges of a transmission band are sharp. This makes it possible to display an image with high brightness and high color purity. Moreover, the color filter of this type does not have a problem of heat generation due to absorption as distinct from a pigment-type color filter, has high weather resistance and high durability, and is resistant to fading.

Furthermore, since images of filter elements in the color filter are focused onto the optical modulating device through the use of a beam condensing optical system for reducing the diameter of a parallel beam, they are projected in a reduced size onto corresponding pixel electrodes in the optical modulating device. This enables a high-definition image display without increasing the definition of the color filter. Consequently, it is possible to achieve a projection color image display apparatus of high quality at low cost.

What is claimed is:

1. A projection color image display apparatus comprising:
    an optical modulating device, having pixel electrodes arranged in a required pattern containing basic colors necessary for color display, for modulating incident lights of the basic colors pixel by pixel according to image signals applied to said pixel electrodes;
    a color filter separate from said optical modulated device and composed of filter elements for the basic colors arranged in a pattern corresponding to the a required pattern in said optical modulating device; and
    a beam condensing system for forming images of said filter elements in said color filter on said optical modulating device, said beam condensing system including:
        a first lens for focusing an incident parallel beam emitted from said color filter to form an image; and
        a second lens for converting light from the image formed by said first lens into a parallel beam having a smaller beam diameter than that of the parallel beam incident on said first lens such that the image formed by said second lens is smaller than the image formed by said first lens, and for emitting the converted parallel beam.

2. A projection color image display apparatus according to claim 1, wherein said color filter is formed of a thin-film interference filter composed of layered inorganic thin films.

3. A projection color image display apparatus according to claim 1, wherein said optical modulating device is a liquid crystal display device.

4. A projection color image display apparatus according to claim 1, wherein said optical modulating device is an electrically controlled birefringent device that causes birefringence in the incident lights through the application of voltage to said pixel electrodes.

5. The projection color image display apparatus of claim 1, wherein said optical modulating device modulates the incident lights of the basic colors by selectively changing polarization directions of the incident light pixel by pixel such that the incident light associated with each pixel is either p-polarized light or s-polarized light.

6. The projection color image display apparatus of claim 5, further comprising a beam splitter for separating the p-polarized light from the s-polarized light and directing one of said p-polarized light and s-polarized light to said optical modulating device.

7. The projection color image display apparatus of claim 3, wherein said optical modulating device modulates the incident lights of the basic colors by selectively changing polarization directions of the incident light pixel by pixel such that the incident light associated with each pixel is either p-polarized light or s-polarized light.

8. The projection color image display apparatus of claim 7, further comprising a beam splitter for separating the p-polarized light from the s-polarized light and directing one of said p-polarized light and s-polarized light to said optical modulating device.

* * * * *